United States Patent
Raymond et al.

(10) Patent No.: US 8,554,714 B2
(45) Date of Patent: Oct. 8, 2013

(54) HIGH VOLUME ALARM MANAGEMENT SYSTEM

(75) Inventors: Michelle Raymond, Minneapolis, MN (US); Liana Maria Kiff, Minneapolis, MN (US); Sophie Burkart, Chagrin Falls, OH (US); Rob Warner, Newburyport, MA (US); Prabhat Ranjan, Bangalore (IN); Barnali Chetia, Bangalore (IN); Mahesh Tripathy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 584 days.

(21) Appl. No.: 12/840,636

(22) Filed: Jul. 21, 2010

(65) Prior Publication Data

US 2011/0010654 A1 Jan. 13, 2011

Related U.S. Application Data

(63) Continuation-in-part of application No. 12/463,613, filed on May 11, 2009, now Pat. No. 8,224,763.

(51) Int. Cl.
*G06F 17/00* (2006.01)
*G06N 5/02* (2006.01)

(52) U.S. Cl.
USPC .......................................................... 706/47

(58) Field of Classification Search
None
See application file for complete search history.

(56) References Cited

U.S. PATENT DOCUMENTS

| | | | |
|---|---|---|---|
| 3,820,102 A * | 6/1974 | Schubert | 340/506 |
| 4,375,637 A | 3/1983 | Desjardins | |
| 4,816,208 A | 3/1989 | Woods et al. | |
| 5,042,265 A | 8/1991 | Baldwin et al. | |
| 5,161,387 A | 11/1992 | Metcalfe et al. | |
| 5,385,297 A | 1/1995 | Rein et al. | |
| 5,390,206 A | 2/1995 | Rein et al. | |
| 5,495,470 A * | 2/1996 | Tyburski et al. | 370/248 |
| 5,768,119 A | 6/1998 | Havekost et al. | |
| 5,929,761 A | 7/1999 | Van der Laan et al. | |
| 5,946,303 A | 8/1999 | Watson et al. | |
| 5,955,946 A | 9/1999 | Beheshti et al. | |
| 6,124,790 A | 9/2000 | Golov et al. | |
| 6,178,362 B1 | 1/2001 | Woolard et al. | |
| 6,185,483 B1 | 2/2001 | Drees | |

(Continued)

FOREIGN PATENT DOCUMENTS

| WO | WO 01/97146 | 12/2001 |
|---|---|---|
| WO | WO 02/052432 | 7/2002 |

(Continued)

OTHER PUBLICATIONS

Honeywell, "Excel Building Supervisor-Integrated R7044 and FS90 Ver. 2.0," Operator Manual, 70 pages, Apr. 1995.

(Continued)

*Primary Examiner* — Li-Wu Chang
(74) *Attorney, Agent, or Firm* — Seager Tufte & Wickhem LLC.

(57) ABSTRACT

As system which contains a vendor-neutral, flexible and efficient alarm grouping and routing algorithm using enterprise level and alarm attributes for filtering. Also, the approach uses rule based alarm assignment to handle diverse alarm signal parameters within large volumes of individual signals coming from multiple sources. Many of the alarm signals may be deemed as unactionable signals and eliminated.

18 Claims, 23 Drawing Sheets

(56) References Cited

U.S. PATENT DOCUMENTS

| | | | |
|---|---|---|---|
| 6,223,544 B1 | 5/2001 | Seem | |
| 6,295,526 B1 | 9/2001 | McCormack et al. | |
| 6,295,527 B1 | 9/2001 | McCormack et al. | |
| 6,314,328 B1 | 11/2001 | Powell | |
| 6,351,213 B1 | 2/2002 | Hirsch | |
| 6,356,282 B2 | 3/2002 | Roytman et al. | |
| 6,420,968 B1 | 7/2002 | Hirsch | |
| 6,430,712 B2 | 8/2002 | Lewis | |
| 6,473,407 B1 | 10/2002 | Ditmer et al. | |
| 6,492,901 B1 | 12/2002 | Ridolfo | |
| 6,535,122 B1 | 3/2003 | Bristol | |
| 6,549,135 B2 | 4/2003 | Singh et al. | |
| 6,675,591 B2 | 1/2004 | Singh et al. | |
| 6,681,156 B1 | 1/2004 | Weiss | |
| 6,690,980 B2 | 2/2004 | Powell | |
| 6,774,786 B1* | 8/2004 | Havekost et al. | 340/517 |
| 6,813,587 B2 | 11/2004 | McIntyre et al. | |
| 6,816,811 B2 | 11/2004 | Seem | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,024,283 B2 | 4/2006 | Bicknell | |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,243,044 B2 | 7/2007 | McCalla | |
| 7,250,856 B2 | 7/2007 | Havekost et al. | |
| 7,277,018 B2 | 10/2007 | Reyes et al. | |
| 7,345,580 B2 | 3/2008 | Akamatsu et al. | |
| 7,457,869 B2 | 11/2008 | Kernan | |
| 7,460,020 B2 | 12/2008 | Reyes et al. | |
| 7,596,613 B2 | 9/2009 | Silverthorne et al. | |
| 7,653,459 B2 | 1/2010 | Pouchak et al. | |
| 7,725,570 B1* | 5/2010 | Lewis | 709/224 |
| 7,819,334 B2 | 10/2010 | Pouchak et al. | |
| 7,826,929 B2 | 11/2010 | Wacker | |
| 2003/0101009 A1 | 5/2003 | Seem | |
| 2003/0171851 A1 | 9/2003 | Brickfield et al. | |
| 2004/0143510 A1 | 7/2004 | Haeberle et al. | |
| 2005/0038571 A1 | 2/2005 | Brickfield et al. | |
| 2005/0043862 A1 | 2/2005 | Brickfield et al. | |
| 2005/0143671 A1* | 6/2005 | Hastings et al. | 600/513 |
| 2005/0193285 A1 | 9/2005 | Jeon | |
| 2005/0203490 A1 | 9/2005 | Simonson | |
| 2006/0131380 A1* | 6/2006 | Forrest et al. | 235/376 |
| 2006/0136558 A1 | 6/2006 | Sheehan et al. | |
| 2006/0143439 A1* | 6/2006 | Arumugam et al. | 713/153 |
| 2006/0168013 A1 | 7/2006 | Wilson et al. | |
| 2006/0253205 A1 | 11/2006 | Gardiner | |
| 2008/0010049 A1 | 1/2008 | Pouchak et al. | |
| 2008/0016493 A1 | 1/2008 | Pouchak et al. | |
| 2008/0115153 A1 | 5/2008 | Brindle | |
| 2008/0125914 A1 | 5/2008 | Wacker | |
| 2009/0113037 A1 | 4/2009 | Pouchak | |
| 2010/0100583 A1 | 4/2010 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0222933 A1* | 9/2010 | Smith et al. | 700/286 |
| 2010/0287130 A1 | 11/2010 | Guralnik et al. | |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Trane, "System Programming, Tracer Summit Version 14, BMTW-SVP01D-EN," 623 pages, 2002.
Adobe Acrobat 6.0 Standard, Version 6.0.2, Screenshots, 2 pages, May 18, 2004.
U.S. Appl. No. 12/643,865, filed Dec. 21, 2009.
U.S. Appl. No. 12/703,476, filed Feb. 10, 2010.
U.S. Appl. No. 12/722,364, filed Mar. 11, 2010.
U.S. Appl. No. 12/792,547, filed Jun. 2, 2010.
U.S. Appl. No. 12/822,997, filed Jun. 24, 2010.
U.S. Appl. No. 12/977,701, filed Dec. 23, 2010.
Honeywell Spyder Bacnet User's Guide, 242 pages, Revised Jul. 2009.
Honeywell Spyder User's Guide 202 pages, Released Jul. 2007.
http://blogs.msdn.com/b/khen1234/archive/2005/05/11/416392. aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
http://www.google.com/maps, "Google Maps, Pin Location," 1 page, prior to Nov. 21, 2008.
Microsoft Word Screen Shots, 2 pages, prior to Nov. 21, 2008.
Siemens, BACnet for DESIGO 27 Pages, prior to Dec. 30, 2009.
Tridium, "NiagaraAX Product Model Overview," 7 pages, 2005.
Tridium, "Tridium & Niagara Framework Overview," 9 pages, prior to Oct. 28, 2008.

\* cited by examiner

| ID | Rule Name | Rule Type | RuleEffect | ExecutionPriority | Constraint |
|---|---|---|---|---|---|
| 1 | CTYPhoneRoom | Priority | AlarmSet.priority_FK = 1 | 1 | |
| 2 | StaplesSuppress | Suppression | Alarm.setSuppressed = True | 2 | AlarmSet.Priority_FK != 1 |

| FILTER_ID | ATTR_ID | COL_NAME | VALUE |
|---|---|---|---|
| 1 | 1 | Name | Circuit |
| 2 | 4 | Name | EHM 05 |
| 3 | 2 | Name | RDXE M Slave |

Figure 7

| RULE_ID | FILTER_ID | ORDER | REQUIRED_MATCH_COUNT | SQL_ACTION |
|---------|-----------|-------|----------------------|------------|
| 1 | 1 | | 2 | UPDATE Priority_FK = 3 |
| 1 | 2 | | 2 | UPDATE Priority_FK = 3 |
| 2 | 25 | | 1 | ... |
| 123 | 1 | | 2 | ... |
| 123 | 2 | | 2 | ... |

*Figure 8*

| ROW_ID | FILTER_ID | ATTR_ID | COL_NAME | VALUE |
|---|---|---|---|---|
| 234 | 1 | 10 | Name | WI |
| 235 | 1 | 10 | Name | MN |
| 236 | 1 | 10 | Name | OH |
| 237 | 1 | 10 | Name | IL |
| 238 | 1 | 10 | Name | MI |
| 239 | 2 | 7 | Name | Comp |

*Figure 9*

| ALARM_ID | ATTR_ID | COL_NAME | VALUE |
|---|---|---|---|
| 77570 | 11 | name | Circuit City |
| 77570 | 1 | name | Master Control |
| 77570 | 10 | name | N. Olmstead, OH |
| 77570 | 2 | name | RT 2 COMP DISKS* |
| 77570 | 100 | name | COOL 2 |
| 77570 | 7 | name | RT 2 COMP DISKS* |
| 77570 | 99 | name | COOL 2 |

```
Else if ((@StructuralEntityType = 7) or (@StructuralEntityType = 9 )) begin
    --This is a load alarm, collect load attributes select
    -le.entityID AS entityID,
    @LoadName = le.name,
    @PointType = ope.entityType,
    @PointName = ope.Name,
    @ModuleType = me.entityType,
    @ModuleName = me.name,
    @UnitType = ue.entityType,
    @UnitName = ue.name,
    @CustomerName = ce.name,
    @SiteName = se.name,
    @EntityORD = (':' +RTRIM(ce.name) + '/' + RTRIM(se.name) + '/' + RTRIM(ue.name) + '/' + RTRIM(me.name)+ '/' +RTRIM(ope.
    -(':' + RTRIM(ce.ID)+ '/' +RTRIM(se.ID)+ '/' +RTRIM(ue.entityID)+ '/' +RTRIM(me.entityID)+ '/' +RTRIM(ope.entityID)
    --customer and site do not use types (yet)
    -(':','+ ','+ '/' + RTRIM(ue.entityType) + '/' + RTRIM(me.entityType) + '/' + RTRIM(ope.entityType) + '/') AS
    From ModuleEntity me, OutputPointEntity ope, UnitEntity ue, SiteEntity se, CustomerEntity ce, LoadEntity le
    Where    le.outputPoint_FK = ope.entityID
        AND me.entityID = ope.module_FK
        AND me.Unit_FK = ue.entityID
        AND ue.Site_FK = se.ID
        AND se.CustomerID_FK = ce.ID
        AND le.entityID = @associatedEntityID
```

/—24

```
--Write the filter values to the filter tables
IF @CustomerName  is not null insert into new_alarm_values_char(alarm_id, attr_id, col_name, val) values (@alarmID, 11. 'name', @CustomerName)
IF @UnitName      is not null insert into new_alarm_values_char(alarm_id, attr_id, col_name, val) values (@alarmID, 1. 'name', @UnitName)
IF @SiteName      is not null insert into new_alarm_values_char(alarm_id, attr_id, col_name, val) values (@alarmID, 10. 'name', @SiteName)
IF @ModuleName    is not null insert into new_alarm_values_char(alarm_id, attr_id, col_name, val) values (@alarmID, 2. 'name', @ModuleName)
IF @PointName     is not null insert into new_alarm_values_char(alarm_id, attr_id, col_name, val) values (@alarmID, 100. 'name', @PointName)
IF @MonitorName   is not null insert into new_alarm_values_char(alarm_id, attr_id, col_name, val) values (@alarmID, 5. 'name', @MonitorName)
IF @LoadName      is not null insert into new_alarm_values_char(alarm_id, attr_id, col_name, val) values (@alarmID, 7. 'name', @LoadName)
IF @AlarmName     is not null insert into new_alarm_values_char(alarm_id, attr_id, col_name, val) values (@alarmID, 99. 'name', @AlarmName)

IF @AlarmType     is not null insert into new_alarm_values_char(alarm_id, attr_id, col_name, val) values (@alarmID, 99. 'name', @AlarmType)
IF @SiteNmb       is not null insert into new_alarm_values_char(alarm_id, attr_id, col_name, val) values (@alarmID, 10. 'name', @SiteNmb)
IF @ModuleType    is not null insert into new_alarm_values_char(alarm_id, attr_id, col_name, val) values (@alarmID, 2. 'name', @ModuleType)
IF @PointType     is not null insert into new_alarm_values_char(alarm_id, attr_id, col_name, val) values (@alarmID, 100. 'name', @PointType)
IF @UnitType      is not null insert into new_alarm_values_char(alarm_id, attr_id, col_name, val) values (@alarmID, 1. 'name', @UnitType)
```

*Figure 12*

```
SELECT RULE_ID, ALARM_ID, REQUIRED_MATCH_COUNT, COUNT(RULE_ID) AS FOUND_MATCH_COUNT         ⎫
INTO #temp_FOUND_MATCHES                                                                    ⎬ 200
FROM RULE_TBL,                                                                              ⎭
    (SELECT FILTER_ID, ALARM_ID                              ⎫
    FROM FILTER_TBL_NUM                                      ⎪
    INNER JOIN NEW_ALARM_VALUES_NUM                          ⎪ 201
    ON FILTER_TBL_NUM.ATTR_ID = NEW_ALARM_VALUES_NUM.ATTR_ID ⎪
    AND FILTER_TBL_NUM.COND = NEW_ALARM_VALUES_NUM.VAL       ⎪
    AND FILTER_TBL_NUM.COL_NAME = NEW_ALARM_VALUES_NUM.COL_NAME ⎭

UNION ALL

SELECT FILTER_ID, ALARM_ID                                                                  ⎫
    FROM FILTER_TBL_CHAR                                                                        ⎪
    INNER JOIN NEW_ALARM_VALUES_CHAR                                                            ⎪ 202
    ON FILTER_TBL_CHAR.ATTR_ID = NEW_ALARM_VALUES_CHAR.ATTR_ID                                  ⎪
    AND NEW_ALARM_VALUES_CHAR.VAL LIKE ('%' + FILTER_TBL_CHAR.COND + '%' )                      ⎪
    AND FILTER_TBL_CHAR.COL_NAME = NEW_ALARM_VALUES_CHAR.COL_NAME)                              ⎭
    as #tempMatch
WHERE RULE_TBL.FILTER_ID = #tempMatch.FILTER_ID
GROUP BY RULE_ID, ALARM_ID, REQUIRED_MATCH_COUNT SELECT RULE_ID, ALARM_ID                              ⎫
FROM #temp_FOUND_MATCHES                              ⎬ 203
WHERE FOUND_MATCH_COUNT = REQUIRED_MATCH_COUNT        ⎭

TRUNCATE NEW_ALARM_VALUES_NUM      ⎫ 204
TRUNCATE NEW_ALARM_VALUES_CHAR     ⎭
```

HIGH VOLUME ALARM MANAGEMENT SYSTEM

This is a continuation-in-part application of U.S. patent application Ser. No. 12/463,613, filed May 11, 2009, and entitled "A signal management system for building systems".

U.S. patent application Ser. No. 12/463,613, filed May 11, 2009, is hereby incorporated by reference.

BACKGROUND

The invention pertains to alarms and particularly to alarm management. More particularly, the invention pertains to management of large volumes of alarms.

SUMMARY

The invention is an approach which contains a smart, flexible and efficient alarm grouping and routing algorithm using enterprise level and alarm attributes for filtering. Also, the approach uses rule based alarm assignment to handle diverse alarm signal parameters within large volumes of individual signals. Many of the alarm signals may be deemed as nuisance signals and eliminated.

BRIEF DESCRIPTION OF THE DRAWING

FIG. 5 is a diagram of a table representing an extensible rules model;

FIG. 7 is a diagram of an example filter table;

FIG. 8 is a diagram of an example rule table;

FIG. 9 is diagram of another example filter table;

FIG. 10 is a diagram of an example alarm table;

FIG. 11 is a printout showing part of a stored procedure for collecting filter values;

FIG. 12 is an illustrative example of script for establishing and using an alarm filter;

DESCRIPTION

Figure 1:
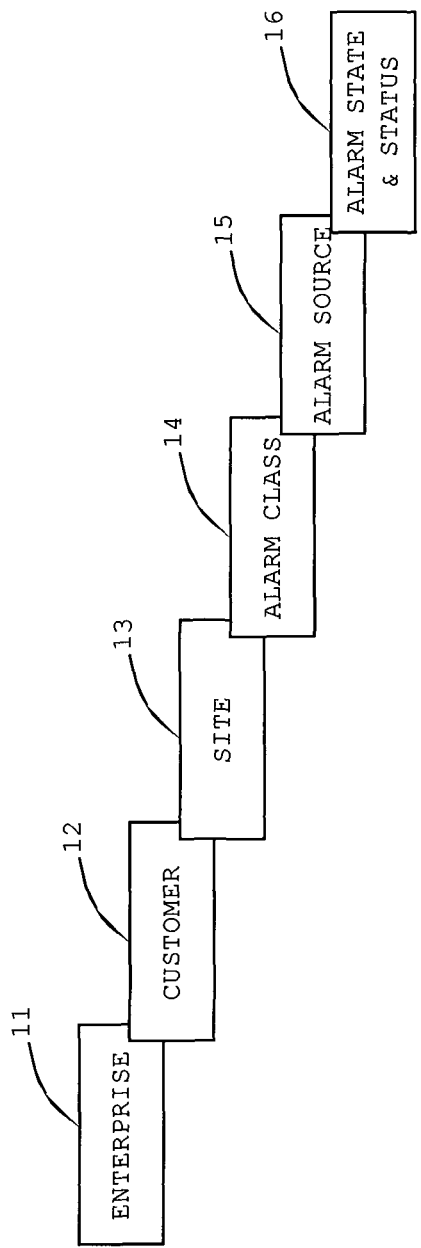
FIG. 1 is a diagram that describes the topographical information required for alarm management irrespective of the vendors and system types.

The invention stems from a need to manage a design of an alarm system to increase its usability. Often a major usability issue with related-art alarm management systems is that there are too many alarms annunciated during a plant upset, usually referred to as an alarm flood, since it is so much like a flood caused by excessive rainfall input (alarms) with a basically fixed drainage output capacity (i.e., number of operators and efficient resolution). A major problem with any alarm management strategy may include a fact that there are more alarms than an operator or a group of operators who can handle and deal within a given amount of time. Therefore, a goal is always to remove the alarms that do not require immediate response by human operators (unactionable), but still retain those that are important. There is an industry paradigm which says "Too few alarms are worse than too many". Alarm reduction methodologies applied at controller often lead to irrational reduction of alarms just for the sake of reduction. There appears to be a need for enterprise alarm management software which may help in "nuisance analysis" and enable system operators and administrators to define their own alarm rationalization based on need and risk.

There exist approaches by which one may decrease the flood of alarms by applying various control algorithms at the controller level and suppression strategies at the application/control level. But these approaches may leave one with enormous volumes of alarms which are very difficult to manage and handle for large enterprises. It is also the case that it is not always possible to apply either of these other strategies to legacy systems where the configuration is outside the control of central operators. There appears to be a need for a smart filtering and routing algorithm independent from the devices originating the alarms, to filter and route the critical alarms in a more reliable manner. This may necessitate a need for logical grouping of alarms based on the alarm attributes and applying different routing strategies to break the enormous volume of alarms into manageable chunks, and route them to the appropriate operators. A basic purpose may be to "present only the set of alarms to the operators that they wish to see" and filter out all the unactionable, standing and chattering alarms. (A standing alarm is one that is caused by a fault in the system that will not be removed or repaired, e.g., a bad sensor that is not considered essential for control.)

There appears to be a need for an efficient and reliable alarm routing mechanism or algorithm which is flexible, user configurable and is outside the source of the alarm. The routing strategy should be defined by the needs of the operating center and should allow the pertinent business to meet the service level expectations set by their customers. The routing algorithm should be based on the key essential attributes of the alarm, which may enable smart alarm management strategies.

The following definitions may be used in the present description. An "alarm group" may refer to an organization of alarms into a logical set. "Alarm routing" may refer to using pre-determined algorithms and information about a current system state (responsibility, logged-in operators, workload, escalation conditions, and so forth) that automatically assign an alarm or alarms to a specific operator or group of operators for follow-through. A "rule engine" may mean an extensible schema for defining rules, and an intuitive user interface for creating rules for alarm management and system configuration. A "user group" may be a set of system users collected into a group, e.g., for the purposes of assigning monitoring responsibility for an alarm routing group. A "filter" may be a set of parameters that define the items of interest from a larger set of items, by specifying terms of what to include in or to exclude from a specified set of data points. Filters may affect the display of alarm records to an end user. "Unactionable alarms" may be those that are perceived to have no value in the overall management of alarms for a facility.

Receiving

The present approach may provide a means to collect alarms from disparate sources and convert those alarms into a single, uniform format. This allows alarms from multiple sources to be handled through the use of a common User Interface, which is configured to support the operators in providing appropriate alarm response services to multiple customers.

Grouping

The present approach may contain smart, flexible and efficient alarm grouping and routing algorithm using enterprise level and alarm attributes for filtering. An alarm group may refer to the organization of alarms into a logical set. The alarm group may be any collection of alarms that is represented in a non-transitory manner in the database. For example, the group may be a database structure that identifies specific alarms as members of a group, or connects alarms to each other by some rules (e.g., all the alarms from a unit). Alarm grouping may be independent of the alarm filtering and sorting and can be used in combination with or independent of filtering rules. An enterprise level RDBMS (relational database management system) may be designed to support containment of objects by other objects in the system (e.g., points by controllers, supervisory controllers at sites, sites belonging to a customer).

Alarm grouping may almost exclusively be used to provide a way to route alarms. Some customers may use the priority field as a way to assign alarms to groups for this purpose. As to routing versus assignment, there appears to be value in allowing alarms to be in an "unassigned" state. Alarm groups may be routed to a group of users (i.e., routing group). Alarms are not necessarily assigned at this stage.

Routing

The present approach may relate to an algorithm for using information about alarms to route the alarms to a well designated and qualified set of people who are proficient in handling the particular types of alarms assigned to them for improving operator efficiency and alarm management strategies.

Once an alarm group has been created, the system may route the alarm group to an operator or operators (based on roles). A routing group collects alarms into logical sets for the purpose of directing alarm instances to an appropriate operator for handling. Generally, these logical sets may be specified by the person responsible for configuring the monitoring requirements for customer sites.

A routing algorithm may address the case when there are no logged-in users that support a particular routing role. Routing roles do not prevent persons outside the role from viewing those alarms on demand (pull/filter).

Assignment

Assignment may generally be regarded as singular (i.e., only one person). Routing may be by role (all users who are members of the role). All users who fill that role may see unresolved alarms in a role-based view (pull or on-demand viewing), or may have them pushed to them on an alternative channel (push channels are email and pager systems) per their notification settings. User groups used for routing purposes may be routing role groups. The assignment of Alarm Groups to Routing Roles may be many-to-many. The assignment of users to Routing Groups is also many-to-many.

Assignment may occur through several mechanisms. The user may select an unassigned alarm from the list of open alarms for his/her routing role(s). A supervisor or someone in a lead role may decide to assign open alarms to specific team members. The system may force an assignment to a specific user (by routing role), e.g., in an escalation scenario, or by assigning the next available alarm in queue to the next available operator.

The system may allow for configurations that assign alarms directly (i.e., bypass the unassigned state). If a role group has only one member, that member may have the alarms directly assigned to them.

Individual assignment assures that more than one operator will not try to select and act on the same alarm at the same time. Already assigned alarms can be filtered from the display to support a work process. However, by using appropriate filters, an operator can view all alarms as needed, whether or not they are assigned to someone else. Assignment can be persistent, or can expire or be cancelled when an operator logs out of the system. There may be alarms which are not urgent and could stay in an operator's queue even when they are logged out. Operators may be allowed to specify at log-out if there are alarms that should stay assigned to them. Escalation features in the system can be configured to identify and handle alarms that should not stay assigned to logged-out operators.

Alarm State Machine

Once an alarm is assigned to a specific operator, it is tracked through a customizable workflow that covers the following individual stages of alarm resolution. These states are ordered, and an alarm may only move forward from one state to one of the possible following states.

Acknowledged State: This describes the state where a specific operator has seen an alarm, but has not acted on it. An alarm can go from Acknowledged to Pending or Resolved, but an acknowledged alarm can not be unacknowledged.

Pending State: The Pending state indicates that the operator is addressing the alarm, but is waiting for further information, or waiting for the condition to clear. It is generally the case that a Pending alarm has been classified with a "Diagnosis" or a description of what the operator identified as the root cause. A Pending alarm can remain in the Pending state, or proceed to a resolved state, but it may not revert to Acknowledged or Unacknowledged.

Resolved State: The alarm is resolved when the root cause problem has been addressed and the condition that initiated the alarm is cleared. A resolution can not be reversed. If the alarm reoccurs it will be treated as a new event and the process will start over.

A Diagnosis is an assessment of root cause that precipitated an alarm condition. A Diagnosis should be specific enough to be followed by a prescribed action. The system provides a way to identify the appropriate root cause effects of alarms, based on the needs of the operations center that is using the routing system. Example diagnoses are "Compressor Failure" or "Valve Failure".

A Resolution is a statement of the action taken to clear an alarm condition. The system provides for a way to identify and customize the Resolution Codes that are appropriate to the response capabilities and offered services of the operations center. Example Resolution Codes may include "Technician sent to service Compressor" or "Valve obstruction cleared by temporarily increasing system pressure."

Operator User Interface

There may be an alarms "dashboard" in the operator console that shows current statistics (open alarms, alarms in escalation, and so on) to keep the operator alert to overall traffic in the center. Also, it may be valuable to have a role-based dashboard view.

It is also possible to provide email or special notification through another channel. This is for the case where a user who is not logged into a console session need to be alerted of very critical alarms by some other channel. Notification settings may be user-specific.

Enterprise Topography

An enterprise model may allow the system to recognize the topographical relationship between components in a system. FIG. 1 is a diagram that describes the topographical information required for alarm management irrespective of the vendors and system types. Key attributes for effective alarm grouping and routing may involve enterprise 11, customer 12, site 13, alarm class 14, alarm source 15, and alarm state and status 16. An alarm management system may be designed to recognize the topographical relationship between components in the system. The system may have a very intuitive and friendly rule based engine that enables the administrators of the system to configure and create rules based on alarm attributes and add these rules to a group according to their service level agreements. The system may support a user in defining logical groups of alarms based on fields present in either the universal alarm object, or the enterprise model, arbitrary rules or any combination of these fields (e.g., all alarms from a particular customer at a particular site).

Equipment Topography

The rule engine may support the hierarchy in the equipment model and help create a rule to view alarms from the highest to the lowest level, from the lowest to the highest level, or in any arbitrary order. The rule engine may create a rule for an operator in the background which can be later copied and modified based on the dynamics of a service level contract in effect.

Description of Operation

Administration of Alarm Group

Figure 2A:
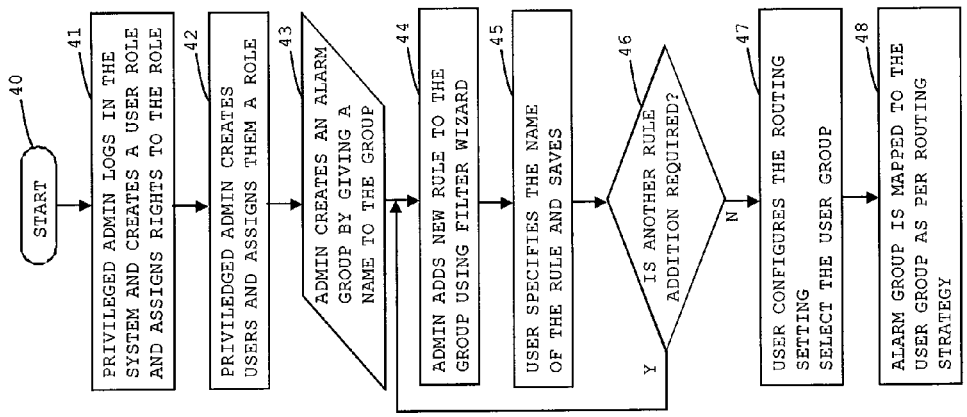
FIGS. 2a and 2b are flow diagrams showing an alarm management approach.

FIG. 2a is a flow diagram showing one possible method of alarm management configuration. Activity, steps, actions and the like of the approach may be referred to at symbols in the diagram. One may start at symbol 40 and then go to symbol 41 which indicates that a privileged administrator may log into the system and create a user role and assign rights to that role. The administrator may create users and assign the users a role at symbol 42. The administrator may create an alarm group by providing a name to such a group at symbol 43. The administrator may add a new rule to the group using a filter wizard at symbol 44. A user may specify a name of the rule and save it at symbol 45. A question of whether another rule addition is required at symbol 46. If the answer is yes, then the actions at symbols 44 and 45 may be repeated for another rule. This activity may continue until no more rules are required. If the answer is no to the question in symbol 46, then the user may configure the routing setting and select a user group at symbol 47. The alarm group may be mapped to the user group according to a routing strategy at symbol 48.

Display of Alarm Group and Incoming Alarm

Figure 2B:
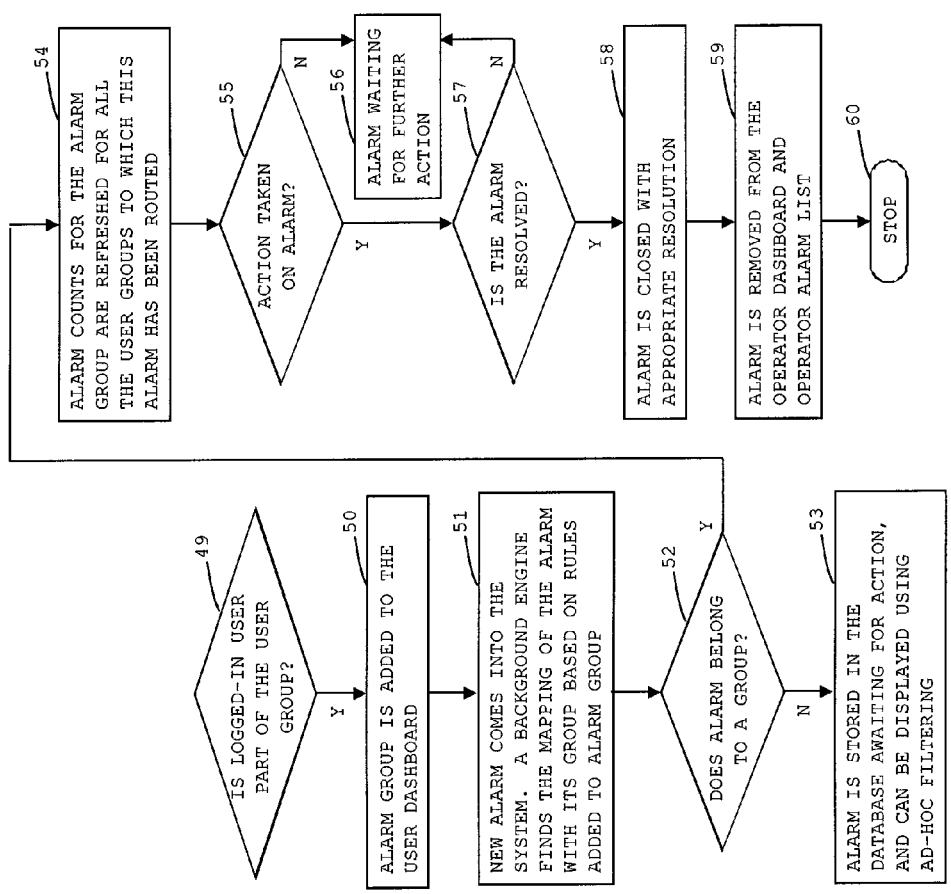
Figure 4:
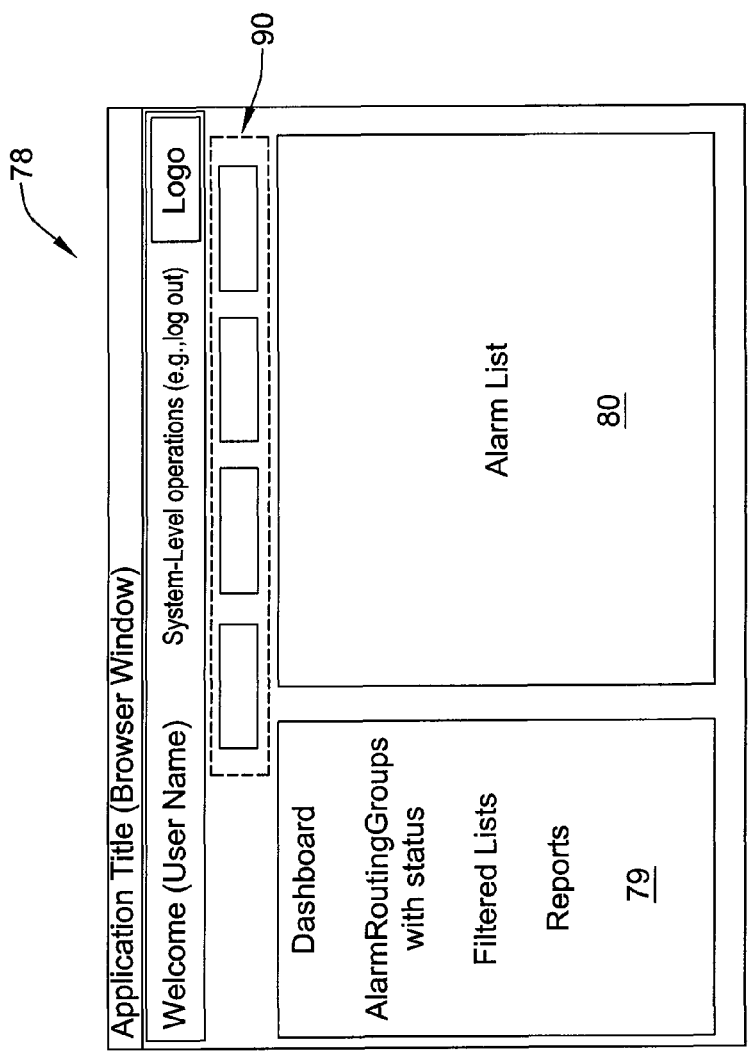
FIG. 4 is a diagram of a screenshot of a display which may be used with an alarm management system.

FIG. 2b notes a query at symbol 49 of whether the logged-in user is a part of the user group. If the answer is yes, then an alarm group may be added to a user dashboard at symbol 50. (This query may be repeated for all existing alarm groups to determine if they should be displayed to this user.) (An example user dashboard is shown in FIG. 4.) A new alarm may come into the system at symbol 51 and a background engine may find the mapping of the alarm with its group based on rules added to the alarm group. A question of whether the alarm belongs to a group at symbol 52. If the answer is no, then the alarm may be stored in a database waiting for action, and can be displayed using ad-hoc filtering, at symbol 53. If the answer is yes, then the alarm counts for the alarm group may be refreshed for all the user groups to which the present alarm has been routed, at symbol 54. A question of whether action is taken on the alarm may be asked at symbol 55. If the answer is no, then the alarm may wait for further action at symbol 56. If the answer is yes, then a question of whether the alarm is resolved may be asked at symbol 57. If the answer is no, then the alarm may wait for further action at symbol 56. If the answer is yes, then the alarm may be closed with appropriate resolution at symbol 58. At symbol 59, the alarm may then be removed from the operator dashboard and the operator alarm list. The approach may stop at symbol 60.

Figure 3:
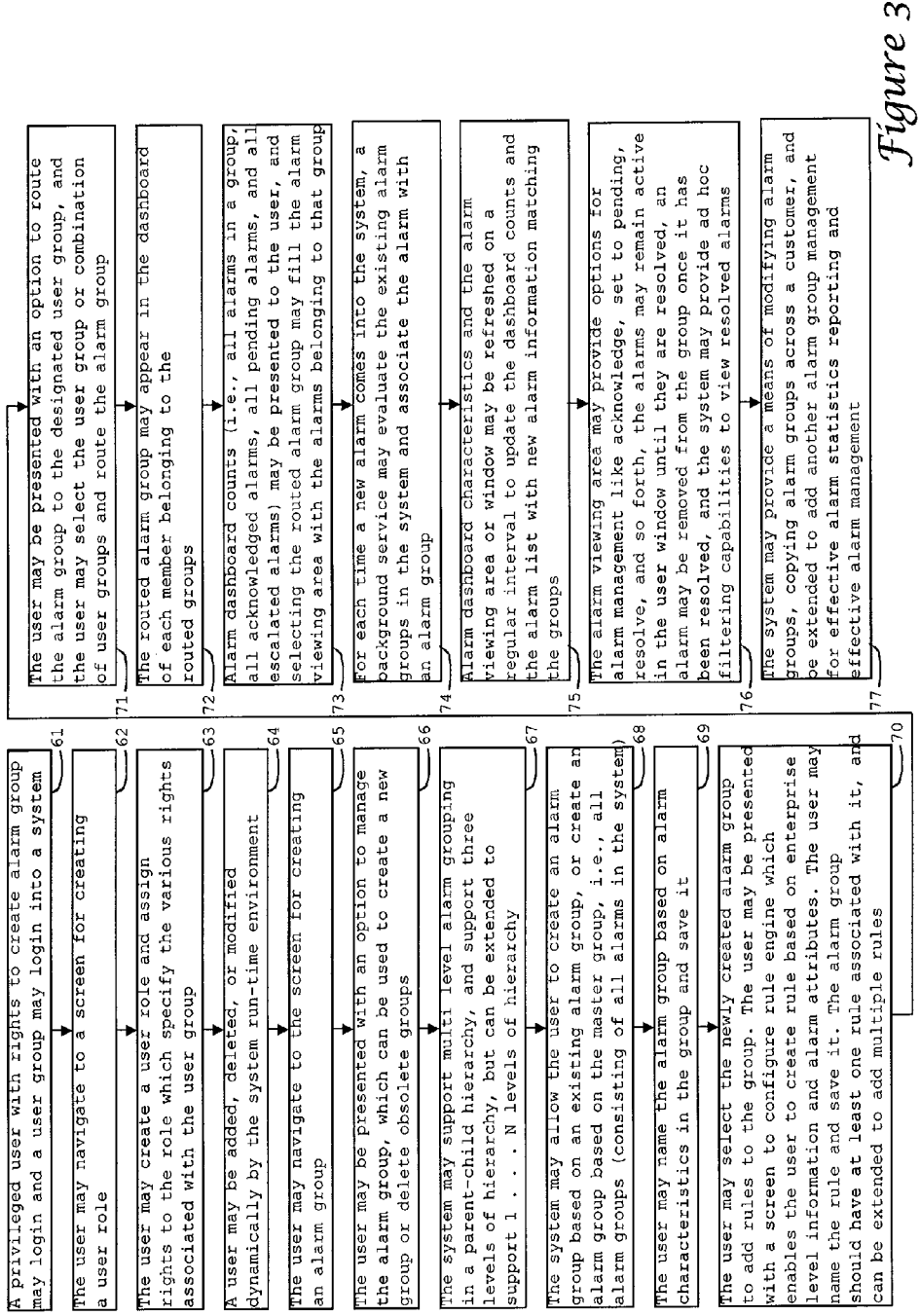
FIG. 3 is a flow diagram showing further details of the alarm management approach.

The details of the present approach may be presented in another manner in a diagram with symbols in FIG. 3. A privileged user with rights to create alarm group may login, and a user group may login into a system, at symbol 61. A user may navigate to a screen for creating a user role, at symbol 62. A privileged user may create a user role and assign rights to the role which specify the various rights associated with the user group, at symbol 63. A user may be added, deleted, or modified dynamically by the system run-time environment, at symbol 64. A user may navigate to the screen for creating an alarm group, at symbol 65. A user may be presented with an option to manage the alarm group, which can be used to create a new group or delete obsolete groups, at symbol 66. The system may support multi-level alarm grouping in a parent-child hierarchy, and support three levels of hierarchy, but can be extended to support 1 . . . N levels of hierarchy, at symbol 67. The system may allow the user to create an alarm group based on an existing alarm group, or create an alarm group based on the master group, i.e., all alarm groups (consisting of all alarms in the system), at symbol 68. The user may name the alarm group based on alarm characteristics in the group and save it, at symbol 69. The user may select the newly created alarm group to add rules to the group. The user may be presented with a screen to configure a rule engine which enables the user to create rules based on enterprise level information and alarm attributes. The user may name each rule and save it. The alarm group should have at least one rule associated with it, and the group can be extended to add multiple rules, at symbol 70.

A significant role of alarm groups is to identify sets of alarms that should be suppressed. Suppressed alarms are disposed of by the system and never shown to an operator.

The user may be presented with an option to route the alarm group to the designated user group, and the user may select the user group or combination of user groups and route the alarm group, at symbol 71. The routed alarm group may appear in the dashboard of each member belonging to the routed groups, at symbol 72. Alarm dashboard counts (i.e., all alarms in a group, all acknowledged alarms, all pending alarms, and all escalated alarms) may be presented to the user, and selecting the routed alarm group may fill the alarm viewing area with the alarms belonging to that group, at symbol 73. For each time a new alarm comes into the system, a background service may evaluate the existing alarm groups in the system and associate an alarm with an alarm group, at symbol 74. Alarm dashboard characteristics and the alarm viewing area or window may be refreshed on a regular interval to update the dashboard counts and the alarm list with new alarm information matching the groups, at symbol 75. The alarm viewing area may provide options for alarm management like acknowledge, set to pending, resolve, and so forth, the alarms may remain active in the user window until they are resolved, an alarm may be removed from the group once it has been resolved, and the system may provide ad hoc filtering capabilities to view resolved alarms, at symbol 76. The system may provide a way for modifying alarm groups, copying alarm groups across a customer, and be extended to add another alarm group management for effective alarm statistics reporting and effective alarm management, at symbol 77.

FIG. 4 is a diagram of a screenshot 78 of a display which may be used with the alarm management system. A dashboard 79 may show alarm routing groups with their status, filtered lists, reports, and items pertinent to the system. Area 80 may show an alarm list and related information. Area 90 may contain navigation buttons for configuration.

There exist event data processing centers that electronically receive a very large number of event signal instances, on the order of millions daily, with a diversity of signal parameters (i.e., formatted information included in the event data). The format and information content may be based on multiple factors (e.g., customer owning site of event, type of event (e.g., missing data, sensor high limit reached, service of equipment overdue, associated equipment, vendor-proprietary information)), and thus the event signals may vary in structure and amount of data.

Alarm flood and usage of multi-rule based sort and filter mitigation strategies may be noted. For instance, an event signal flood may require faster management both within the initial input evaluation computation and the human/computer event handling. Providing a configurable flexible format for grouping of alarms may aid in algorithm-based alarm mitigation, event queuing, and user interaction design for presenting event information, just to list a few of the many benefits.

The present system may provide a vendor-neutral mechanism to manage alarm parameters that are of interest across a diverse set of alarm sources, and to provide a straight-forward and rich way of filtering to define alarm sub-groups that share common characteristics. These groups may be hierarchical, with sub-filters contributing results to refine the contents of an alarm group. Alarms identified by one of these groups may then be managed according to other capabilities within the system.

Another feature of sub-filter management may be an ability to define customer-specific requirements and provide refinements to alarm group membership in a multi-customer, multi-enterprise alarm response system.

The present approach may allow the end-user to declare alarms that are members of a group through flexible relationship declarations and multiple categorization strategies.

In many other systems, an alarm may only be routed once, according to a single decision tree. Recipients of an alarm stream may then apply user-based filtering constraints (based on the capability of the system). These systems may result in an alarm being annunciated to only one recipient, when it could be relevant to more than one responder role.

The present approach may allow multiple decision trees to result in the assignment of one alarm to more than one user group. The result is that end-users (alarm responders) with specific roles have a higher likelihood to receive "all" the alarms that are relevant to their role, with less user effort. This may result in more effective incident management at a site.

An interface for configuring alarm filters and resulting alarm groups may be based on the user's own terminology. The interface may represent the underlying logic in simple terms which the user can understand.

The end user may be provided with a user interface that allows a build-up of alarm groups based on simple declarations of filters that contribute their results to complete the group. In turn, alarm groups may themselves contain alarm groups (e.g., sub-groups), with the development of each group being a cumulative process (up through the tree). The resulting alarm groups may be used by other alarm management services, not necessarily defined herein. The system may support this approach through the identification of common filtering parameters, and a set of hierarchical rules structures (which could be represented within a relational database) that support the automated processing of the defined rules against the defined parameters.

A filter algorithm may apply appropriate alarm management rules to each alarm as it comes in to the system. The values of one alarm may be taken and compared to all the alarm management rules criteria in one operation to determine the alarm's correct handling.

Entity relationship management in an alarms database may be noted. Entity filters should be made as generic as possible. Certain entity filters may be decomposed to something quite generic. For instance, instead of asking for all alarms with "Module=EHM05", one may ask for alarms that have a key/value pair matching module type and entity name. Filter types are not necessarily based on specific fields, but may be based on "data type" and "comparison type". Filters may be added at any time without recompiling the code that evaluates the filters.

A general process may incorporate the following items. One may get an incoming alarm. Attributes of the alarm may be grabbed and added to filter tables (i.e., filter_PopulateAlarmFilterValuesTables). An entity-specific query may be performed that returns all attributes for that alarm in a generic format. The attributes may be written to the New_Alarm_Values tables. Filters may then be run. Individual filter matches may be found and compared to identify the rules that apply to that alarm signal. The set of satisfied rules may be returned to be executed for each alarm. The right settings may be applied to the alarms. The processed alarm values may be deleted from the filter tables or saved in the database for later use. This rule processing procedure may be a batch activity which occurs once every few seconds on a set of unprocessed alarms.

FIG. 5 shows a table 18 representing an extensible rules model. New rule types and rule effects may be added via the database virtually at any time without recompiling. Conflicting rules may be arbitrated by assigning priority to their execution or application. Constraints may be allowed to further affect how rules are applied and what precedence which they can take. This approach may make business rules configurable.

Figure 6:
FIG. 6 is a diagram of an example table of structural entity types relative to certain attributes.

A question relative to alarm filtering may concern what the attributes look like. FIG. 6 shows an example table 19 of structural entity types relative to certain attributes. For instance, an entity having an ATTR_ID of 1, 2, 3, 4, 125, 345 may have a StructEntityType of Customer, Site, Unit, Module, Executive, and JACE, respectively.

For an illustrative example of a specific kind of filter, a user may say "all alarms with 'Module' named 'Foo' in the signal source path". So the filter would say all alarms with a key value pair "name|Foo on Attribute type 2". The SQL for this query may be "Where ATTR=2 AND COL_NAME='name' AND VALUE LIKE '%Foo%'".

A filter table may look like one designated FILTER_VAL_CHAR, as shown in FIG. 7. It may be an example filter table 20 where a FILTER_ID is associated with ATTR_ID, COL_NAME and VALUE. For instance, FILTER_ID of 1, 2, 3 may have an ATTR_ID of 1, 4, 2, a COL_NAME of Name, and a VALUE of Circuit, EHM 05 and RDXE M Slave, respectively. Numeric conditions may be stored separately from character conditions to simplify matching. Multi-select conditions may each get their own row. Each different data type/comparison type combination may go into a separate table (equality, range, . . . ), such as FILTER_VAL_NUM, FILTER_VAL_CHAR (such as one like table 20), and FILTER_VAL_RANGE.

FIG. 8 shows an example rule table 21 where a RULE_ID is associated with a FILTER_ID, an ORDER, a REQUIRED_MATCH_COUNT and an SQL_ACTION. For instance, a RULE_ID of 1, 1, 2, 123, 123, and FILTER_ID of 1, 2, 25, 1, 2 may have an ORDER, a REQUIRED_MATCH_COUNT of 2, 2, 1, 2, 2, and an SQL_ACTION of UPDATE Priority_FK=3, UPDATE Priority_FK=3, . . . , respectively. Rule table 21 may have a row for each filter. The order column is for a priority where the highest priority match wins.

A general filter process may be noted. One may receive an incoming alarm. Then one may grab its attributes and add them to the filter tables, which can be stored in a process alarm area in a sample database. One may execute or do one or more entity-specific queries that return all attributes for that alarm in a generic format. Those attributes may be written to new alarm values tables. There may be a flexible and automatic method to determine which attributes are required for all of the active filters. For reasons such as efficiency, attributes of which no one is using in a filter should not be collected.

Filtering may be done as a batch process on the incoming stream of new alarms, or on each individual signal. A query may be vender-neutral on either the alarm set table or entity table. In running the filters, matches may be found, a set of rules may be executed for each alarm, the temporary data may be discarded, and the approach may be a batch activity (one every few seconds or so).

When an alarm comes in, the filter attributes appropriate for that alarm may be captured. There may be parent/owner entities described in the path of the alarm. Types/names of the alarm may be checked. Also, any other attributes which are to be supported may be checked.

Attributes may be written into tables for each attribute/comparison type, as for example, in the following: NEW_ALARM_VALUES_CHAR (string "LIKE" another string); NEW_ALARM_VALUES_NUM (numeric equality); and NW_ALARM_VALUES_RANGE (numeric range). New tables may be added as needed for new comparison types.

FIG. 9 shows an example filter table 22, FILTER_TBL_CHAR, where rows of, for instance, an ALARM_ID of 77570 may be associated with FILTER_ID of 1, 1, 1, 1, 1, 2, ATTR_ID of 10, 10, 10, 10, 10, 7, COL_NAME of Name, and VALUE of WI, MN, IA, IL, MI and Comp, respectively. A rule may be applied on an alarm group, i.e., all alarms with WI or MN or OH or IL or MI in the site name and with Comp in the load name.

FIG. 10 shows an example alarm table 23, NEW_ALARM_VALUES_CHAR, where rows of for instance an ALARM_ID 77570 may be associated with ATTR_ID of 11, 1, 10, 2, 100, 7, 99, COL_NAME of name, and VALUE of Circuit City, Master Control, N. Olmstead, Ohio, RT 2 COMP DISKS*, COOL 2, RT 2 COMP DISKS* and COOL 2, respectively. Multi-select filters may be OR conditions, that is, each individual condition gets a row in the table. Alarm values may be matched. A match on any one may result in a true result for that filter.

Values on incoming alarms may be filtered. FIG. 11 shows one possible embodiment of a stored procedure 24 that may collect filter values.

An illustrative example stored procedure 200 for processing alarm filters by type and evaluating Rules is shown in FIG. 12. As to portion 201 of the script, one may ensure to get all of the matching numeric conditions. All of the matching string conditions of portion 202 should be obtained. One may identify each rule in portion 203 that has all of its required matches satisfied. Clean-up may be indicated at portion 204 of the script.

Figure 13:
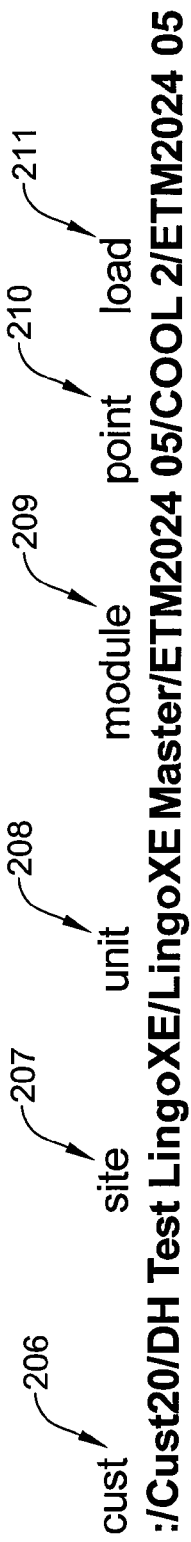
FIG. 13 shows object resolution descriptor which may be used in filtering alarms.

Filtering may be implemented on a "namespace" style identifier, or a path descriptor such as a URL, where each level of the path may describe a discrete level in an ancestral path. This path may contain the name (or ID) of the entity that one is searching on, as well as all of its ancestors. In the present case, the name of a thing may include its cust 206, site 207, unit 208, module 209, point 210 and load 211, as shown in FIG. 13. For example, to filter for all alarms from any module named "ETM", one should know where to find the module name in the string. This may be identified by another path descriptor that identifies each level by type. There may be a match on a pattern (i.e., the number slashes), where RTRIM (entity name) LIKE ':/%/%/%/%ETM%'. To filter for all alarms generated at the module level, one needs to know that the module is identified by the last item in the string where RTRIM (entity name) may be LIKE ':/%/%/%/%ETM'. To filter for all alarms that have a specific module in its path, one may have RTRIM (entity name) LIKE ':/Cust20/DH Test Lingo XE/LingoXE Master/ETM2024 05%'.

Figure 14:
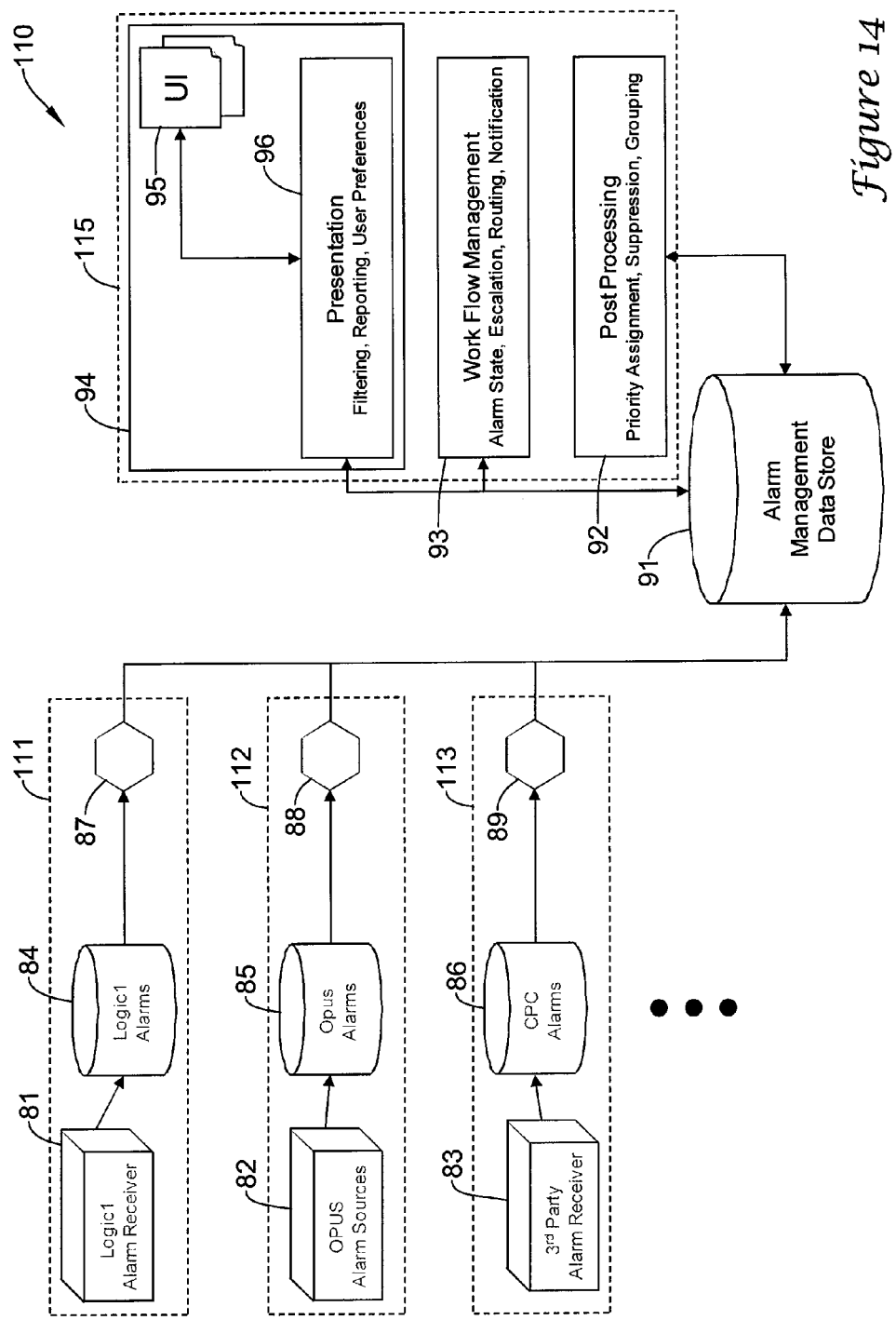
FIG. 14 is a diagram of a multi-enterprise alarm management system.

FIG. 14 is a diagram of a multi-enterprise alarm management system 110. System 110 may consist of multi-enterprise monitoring operations, policy management, operations statistics and service delivery management. Alarm sources may be at Logic1™ (Logic1) alarm receiver 81, OPUS™ alarm sources 82 and one or more third party alarm receivers 83 connected to sources. Alarm signals from the sources may go to vender-specific alarm stores such as Logic1 alarms store 84, Opus alarms store 85 and one or more third party alarm stores 86, respectively. Preprocessors 87, 88 and 89 may be connected to stores 84, 85 and 86, in that order, respectively. The preprocessors may perform extraction, abstraction, bundling and other processing on the alarm signals from the alarm stores. Outputs from the preprocessors may go to an alarm management data store 91. Store 91 may have a two-way connection with a post-processing module 92, a work flow management system 93 and a presentation module 94. Post-processing module 92 may have an alarm priority sub-module, an alarm suppression sub-module and an alarm grouping sub-module for providing priority assignment, suppression, grouping and other processing relative to alarm signals. Work flow management module 93 may have an alarm state sub-module, an alarm escalation sub-module, an alarm routing sub-module and an alarm notification sub-module for providing alarm states, escalation, routing, notification, and other items relative to alarms. A presentation and interface module 94 may incorporate a presentation module 96 having a filtering sub-module, a reporting sub-module and a user preferences sub-module for providing filtering, reporting, user preferences, and other items relative to alarms. Module 94 may also incorporate a user interface module 95 for interfacing. User interface module 95 may have a JSP (Java server pages) mechanism or other items for reporting or presentation of items related to alarm activity. Module 95 may have a two-way connection to presentation module 96.

Receiver 81, store 84 and preprocessor 87 may constitute an alarm interface 111. Receiver 82, store 85 and preprocessor 88 may constitute an alarm interface 112. Receiver 83, store 86 and preprocessor 89 may constitute an alarm interface 113. There may be additional alarm interfaces as needed or desired. Post processing module 92, work flow management module 93, and presentation module 94 may constitute an operations interface 115.

Figure 15:
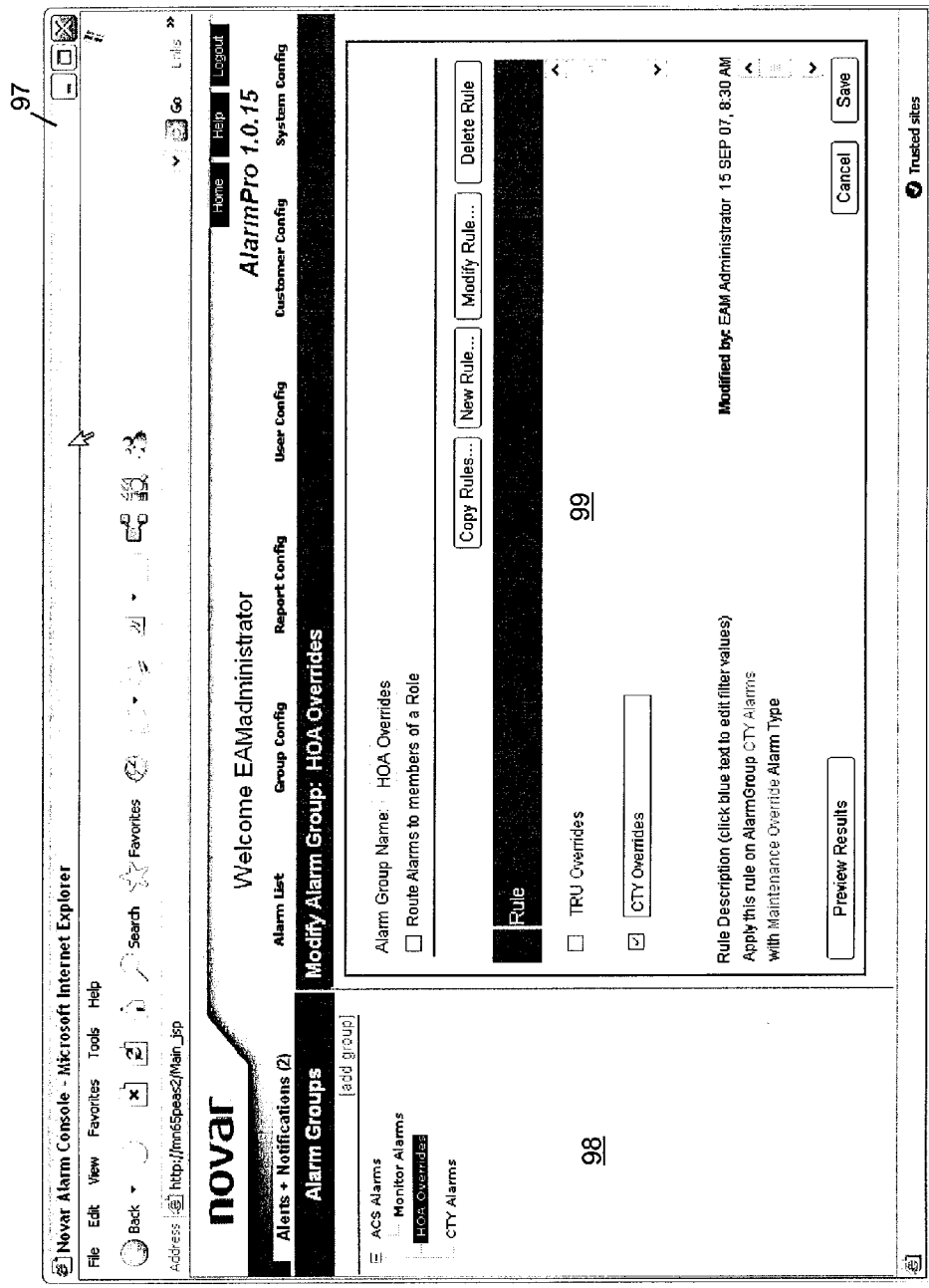
FIG. 15 is a diagram of a screenshot of a rules management user interface screen.

FIG. 15 is a diagram of a screenshot of a rules management user interface screen 97. Screen 97 may show alarm groups in area 98 and a place 99 for modifying an alarm group. Various versions of screen 97 may be pulled up for facilitating alarm management.

Figure 16:
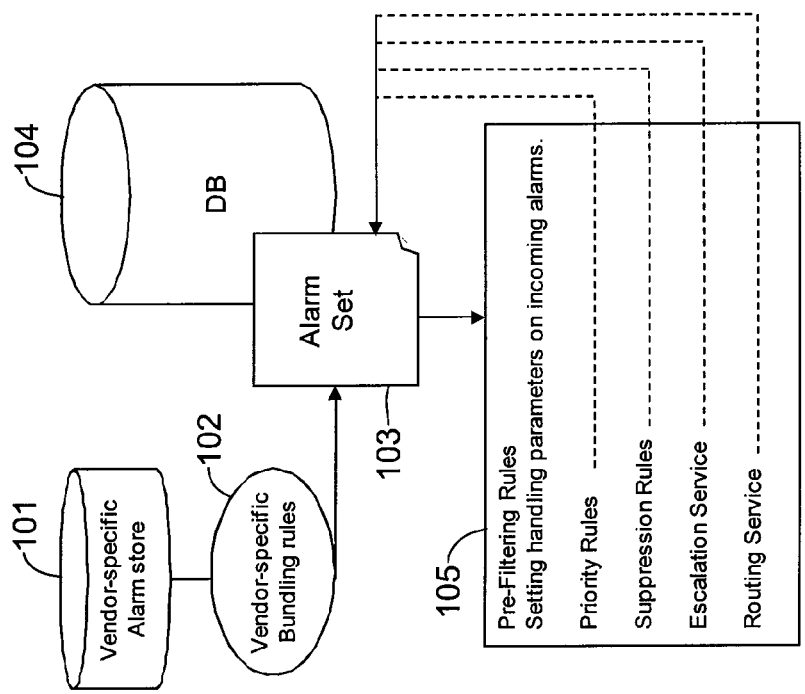
FIG. 16 is a diagram of an alarm management system using rules for pre-filtering.

FIG. 16 is a diagram of an alarm management system with alarm management rules. Alarms or their signals may come from a vendor-specific alarm store 101, which are provided to a module 102 for applying vendor-specific rules to the alarms. Bundled alarms may go as an alarm set 103 to an AlarmPro™ (alarm) database store 104. Alarm set 103 may be subject to a pre-filtering rules module 105. Module 105 may set handling parameters on incoming alarms with pre-filtering rules. For instance, priority rules may include "IF Alarm Type=PhaseLoss THEN set priority=1". The highest priority match may win. Suppression rules may include "IF Alarm Type=Dirty Filter THEN set suppressed=True". One may set a value on the alarm and process later (e.g., archive). Escalation service may include "IF Customer=CITY AND Priority=1 THEN Escalation Service_FK=Premium". Escalation service may identify active alarms to assess. Routing service may include "IF Customer=CTY AND . . . THEN Insert Alarm ID, Group ID into Alarm Group Map".

Figure 17:
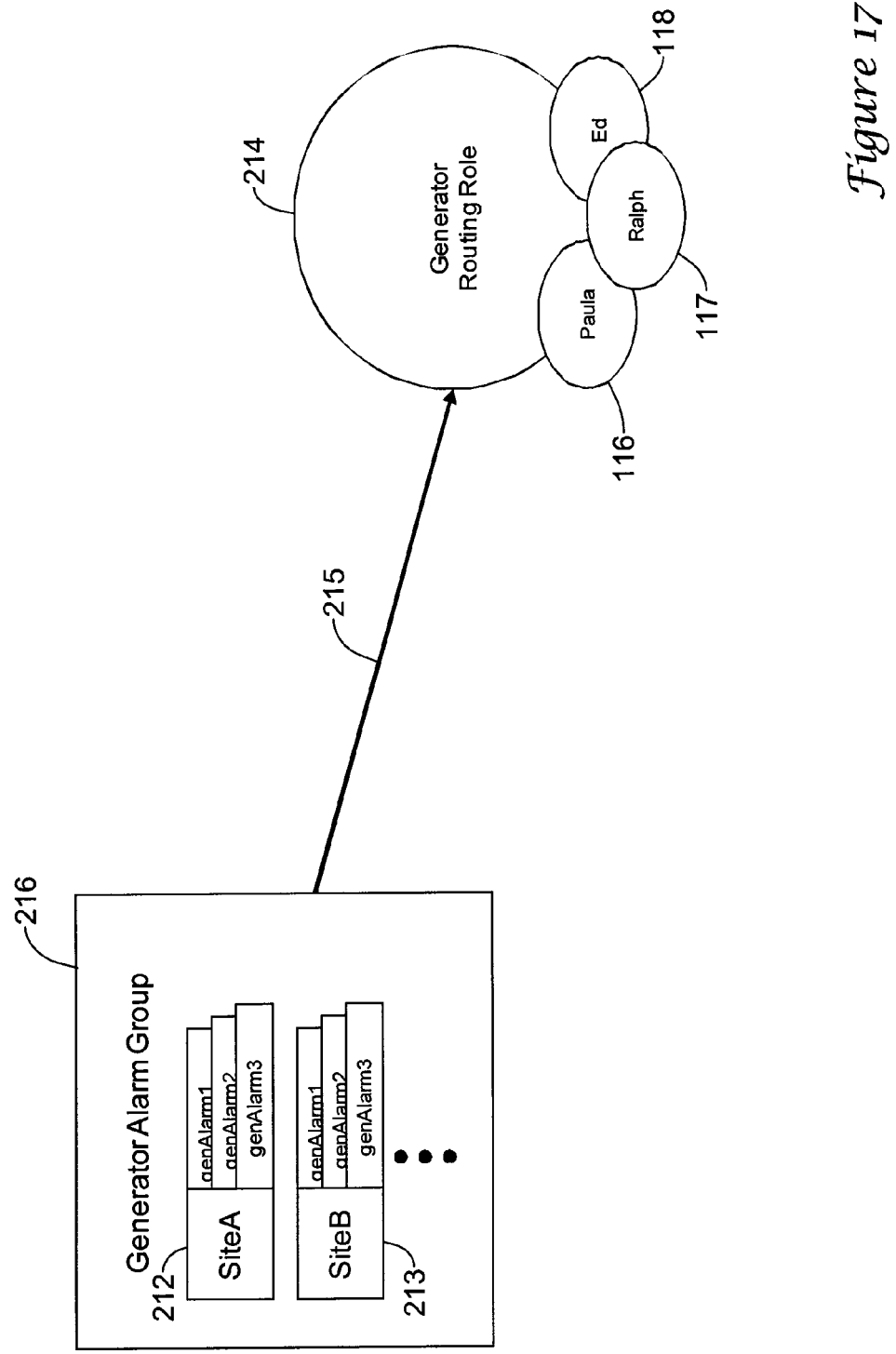
FIG. 17 is a diagram of a generator alarm group having multiple sites with alarms connected to a routing role, which has multiple role members.

FIG. 17 is a diagram of a generator alarm group 216 with alarm sites 212 and 213, each having a set of alarms. There may be additional alarm sites associated with generator alarm group 216. There may be an assignment of an alarm group, for example a group 216, to a routing role, such as generator routing role 214, as indicated by connection 215. Generator routing role may regard people 116, 117, 118 and possibly others who have responsibility for alarms in group 216. Routing roles may involve a collection of user members, which are grouped especially for monitoring. Users may belong to multiple routing roles. The routing roles may be manually maintained. One use case may involve identifying all alarms relating to emergency generators so that they may be routed to the appropriate one or more operators. Another user case may involve identifying a group of alarms belonging to, for example, HVAC alarms of a particular region, and route them to the appropriate one or more operators.

Figure 18:
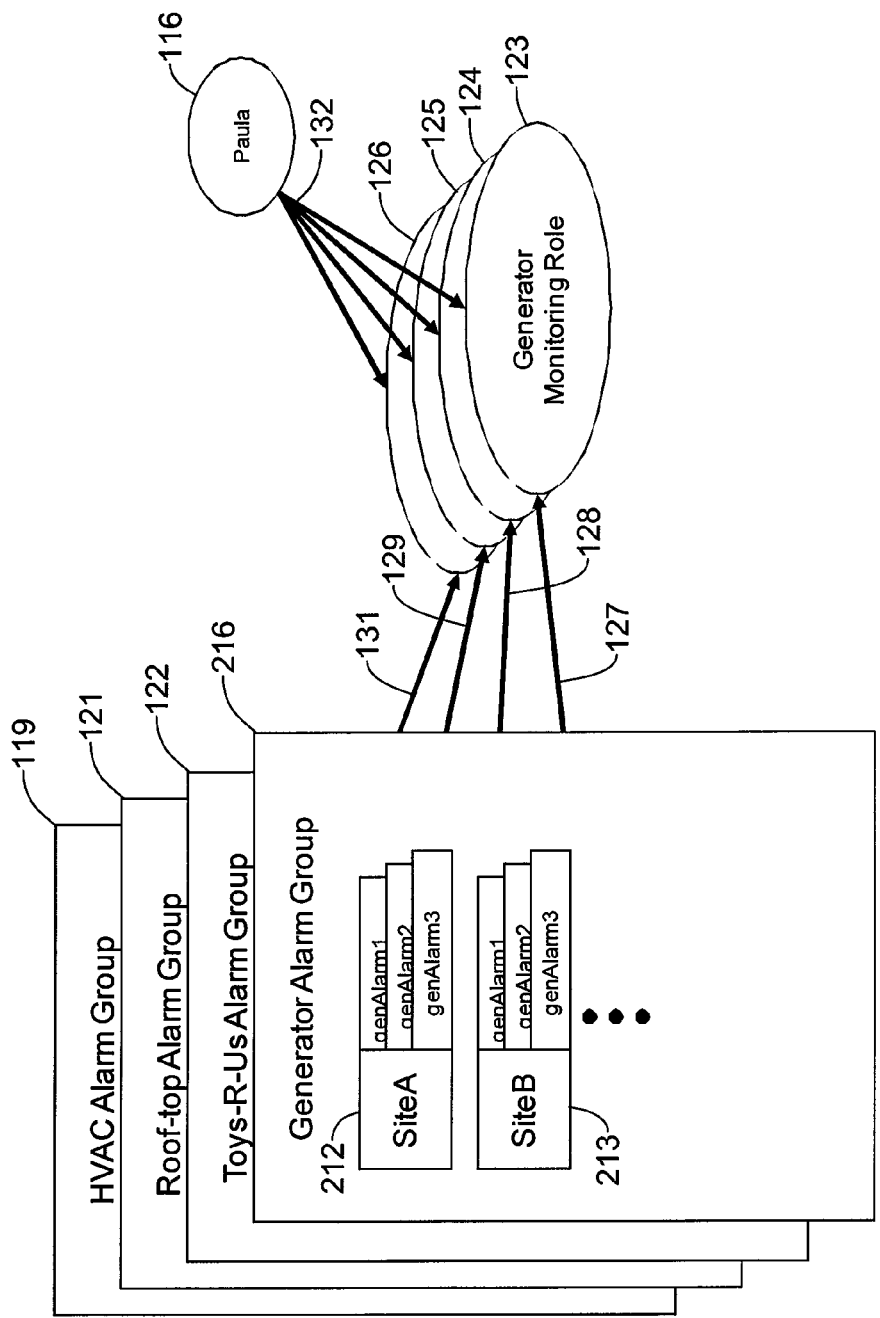
FIG. 18 is a diagram showing that a single person may belong to more than one monitoring Role Group.

FIG. 18 is a diagram showing more than one alarm group, such an HVAC alarm group 119, roof-top alarm group 121, toy company group 122 and generator alarm group 216. There may be an assignment of alarm groups 216, 119, 121 and 122 to routing roles 123, 124, 125 and 126, as indicated by connections 127, 128, 129 and 131, respectively. There may be an operator 116, such as Paula, with multiple roles, who sees a list of unassigned alarms fitting her roles, grouped by role, as shown by connections 132. Paula may also see whatever alarm views she has pre-configured to support her roles and responsibilities.

Figure 19:
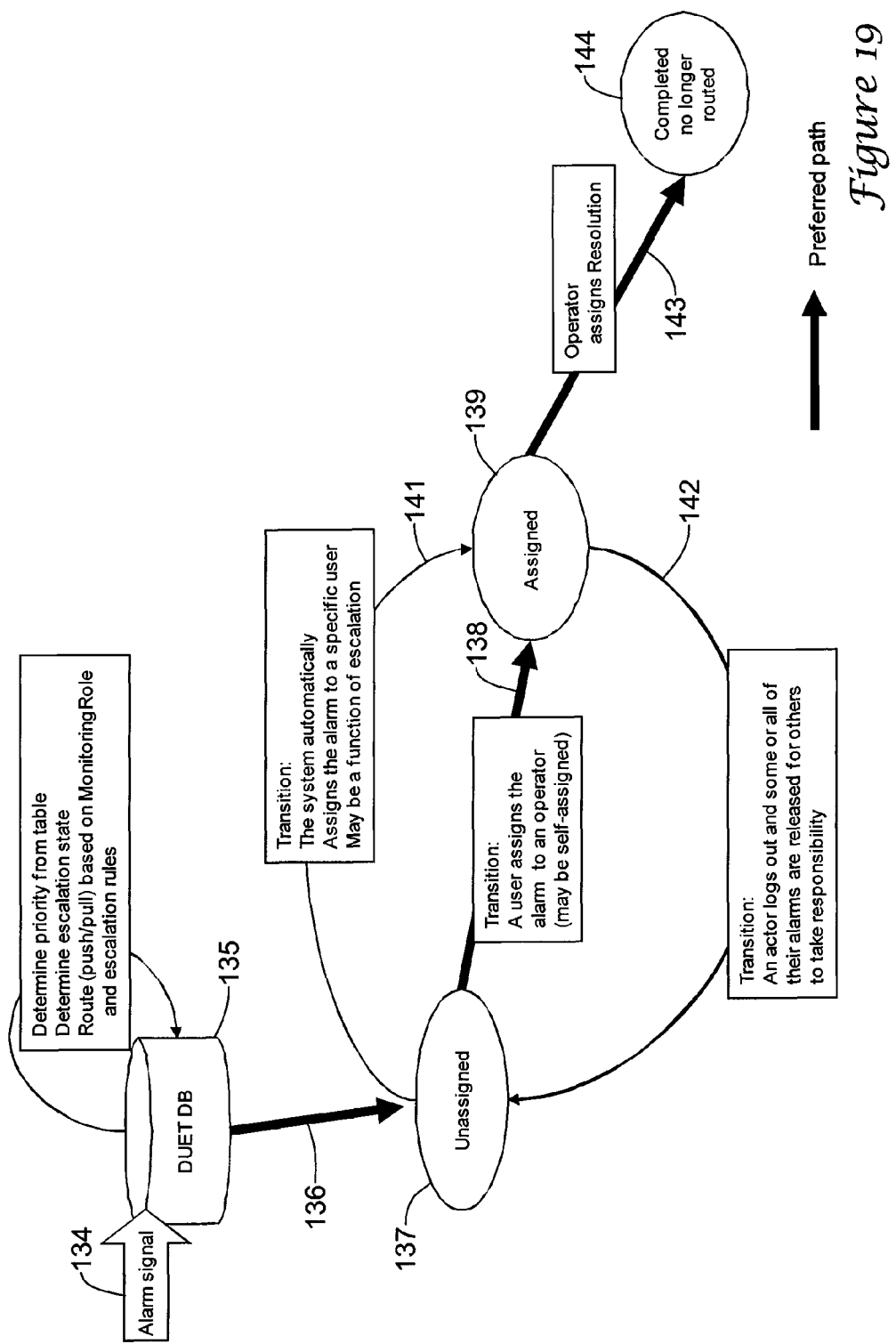
FIG. 19 is a diagram of an alarm routing and assignment state machine of an alarm management system.

FIG. 19 is a diagram of an alarm routing and assignment state machine of the alarm management system. An alarm signal (alarm) 134 may be entered in a database 135. A priority of the alarm 134 may be determined from a table at database 135. The escalation state of alarm 134 may be determined from a set of rules. A route (push/pull) for alarm 134 may be based on a monitoring role and escalation rules. Possible assignment states for the alarm may be "unassigned" (no single/user owns), "assigned" (a specific user has responsibility), and "complete" (an assignment no longer applies; the alarm is not longer in a routed state). Alarm 134 may follow a preferred path to 136 to an unassigned state 137. Along preferred path 138, a user may assign the alarm to an operator, or the alarm may be self-assigned, as indicated by assigned state 139. The system may automatically assign the alarm to a specific user as indicated by a path 141. There may be a transition path 142 from the assigned state 139 back to unassigned state 137. This could be a situation where an actor logs out and some or all of the alarms are released for others to take responsibility. From assigned state 139, the operator may assign a resolution of alarm 134 along a preferred path 143 to a complete state 144 where the alarm is "no longer routed."

Figure 20:
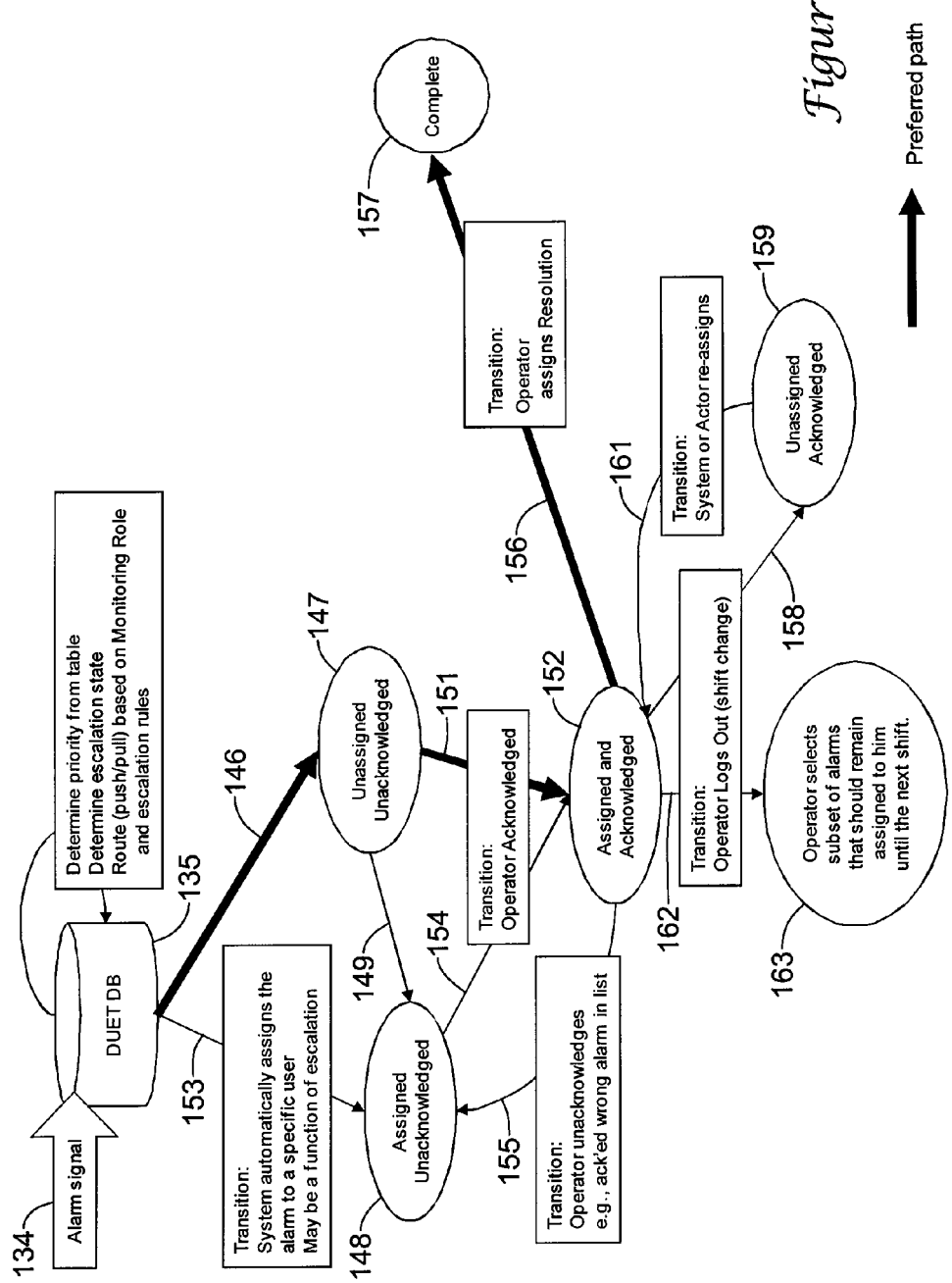
FIG. 20 is a diagram of an alarm management system state machine with assignment and acknowledgement.

FIG. 20 is a diagram of an alarm state machine with assignment and acknowledgement. Possible alarm states may consist of "unacknowledged" (no user has acknowledged receipt), "acknowledged" (a specific user has seen the alarm but has not accepted responsibility for it), "pending" (a user is taking action but the alarm is not resolved), "unassigned" (no single user owns it), "assigned" (a specific user has responsibility), "complete" (resolved. Assignment and acknowledgment are independent conditions which can occur in any combination.

An alarm 134 may be entered in a database 135. A priority of the alarm 134 may be determined from a table at database 135. The escalation state of alarm 134 may be determined from a table at database 135. The escalation state of alarm 134 may be determined from a set of rules based on time in state, or frequency of occurrence. A route (push/pull) for alarm 134 may be based on a monitoring role and escalation rules. Alarm 134 may go from database 135 to an unassigned/unacknowledged state 147 along a preferred path 146. Alarm 134 at state 147 may go to an assigned/unacknowledged state 148 along a path 149.

Alarm 134 may go along a preferred path 151 to an assigned and acknowledged state 152. Or instead, alarm 134 may go from database 135 to state 148 along a path 153. This transition may be where the system automatically assigns the alarm to a specific user. This transition along path 153 may be a function of escalation. Alarm 134 may proceed from state 148 to state 152 along a path 154 when the alarm is operator acknowledged. Alarm 134 could return to the assigned and acknowledged state 148 along a path 155 if the operator unacknowledges alarm 134 such as, for example, a reason of an acknowledged wrong alarm in a list. Alarm 134 may go along a preferred path 156 where the operator assigns a resolution to alarm 134 and enters a complete state 157. Or alarm 134 may go from state 152 along a path 158 to an unassigned and acknowledged state 159. From state 159, alarm 134 may return to state 152 along a path 161 when the system or actor reassigns the alarm. Another transition along a path 162 may occur when the operator logs out, such as in a shift change, and goes to a situation 163 where the operator selects a subset of alarms that should remain assigned to him or her until the next shift.

Figure 21:
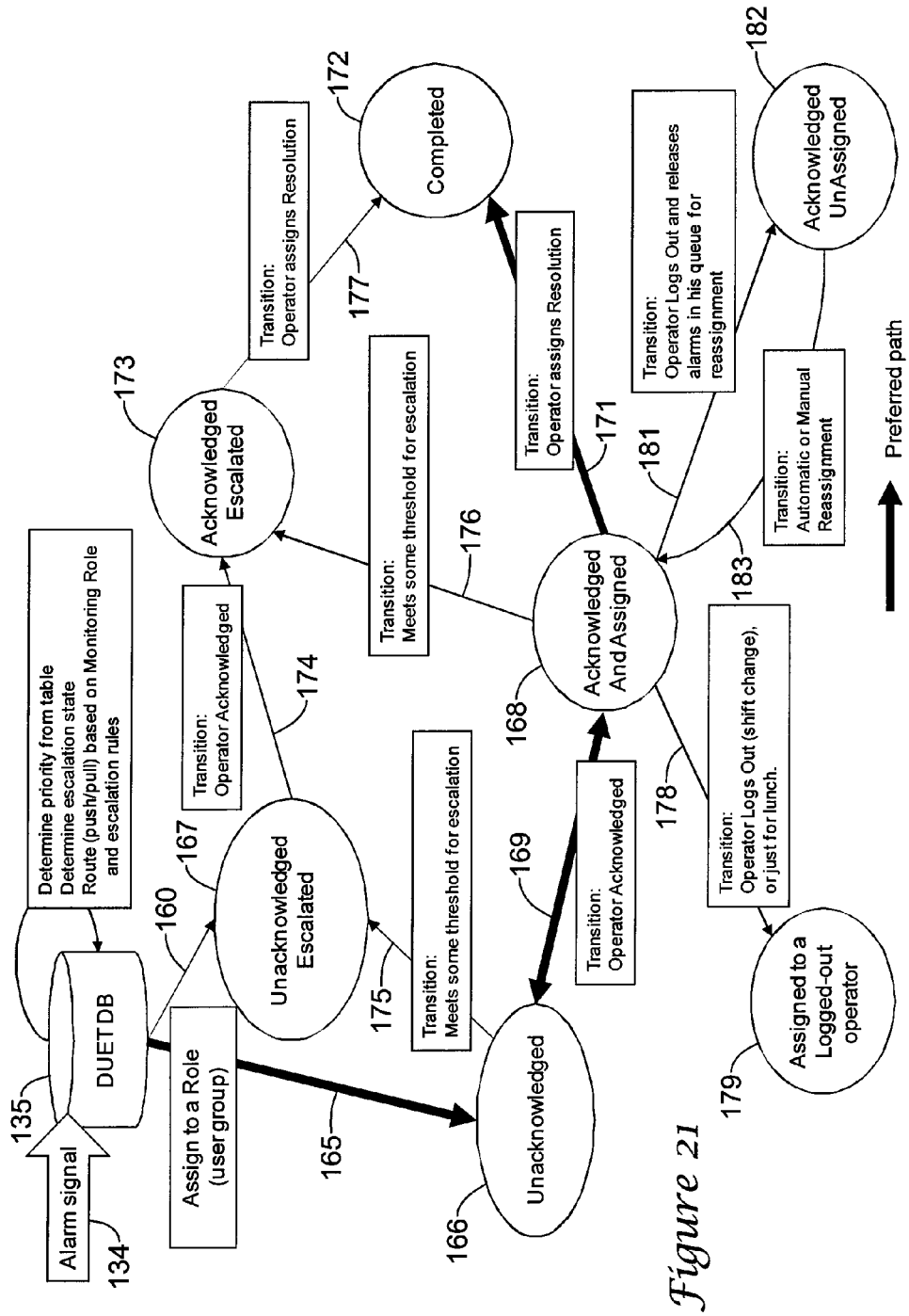
FIG. 21 is a diagram of an alarm management state machine showing the interaction of assignment, acknowledgement and escalation states.

FIG. 21 is a diagram of an alarm state machine with assignment, acknowledgement and escalation. An alarm 134 may be entered in a database 135. A priority of alarm 134 may be determined from a table at database 135. An escalation of alarm 134 may be determined from a set of rules. A route (push/pull) for alarm 134 may be based on a monitoring role and escalation rules. Alarm 134 may be assigned to a role (a user group). Alarm 134 may go along a preferred path 165 to an unacknowledged state 166. Alarm 134 may go from state 166 to an acknowledged and assigned state 168 along a preferred path 169. This transition may be operator acknowledged. From state 168, alarm 134 may be assigned a resolution by an operator along a preferred path 171 and go to a completed state 172.

Alarm 134 may go along a path 160 to an unacknowledged state 167 which may be escalated. One escalation level is modeled here for simplicity but there may be multiple levels of escalation that reflect continued aging of the alarm in the system. Alarm 134 which meets some threshold for escalation may go from state 166 to state 167 along a path 175. Alarm 134 may go from state 167 to an acknowledged and escalated state 173 along a path 174 with a transition of the alarm being operator acknowledged. Alarm 134 may go along a path 176, where the alarm meets some threshold for escalation, to state 173. From state 173, alarm 134 may assigned a resolution by the operator along a path 177 to the completed state 172.

At the acknowledged and assigned state 168, alarm 134 may go along a path 178, where the operator logs out (i.e., shift change or just for lunch), to a state 179 of being assigned to a logged-out operator. Or alarm 134 may go from state 168 along a path 181, where the operator logs out and releases the alarm or alarms in his or her queue for reassignment, to an acknowledged and unassigned state 182. From state 182, alarm 134 or alarms 134 may be automatically or manually reassigned along path 183 to the acknowledged and assigned state 168.

Figure 22:
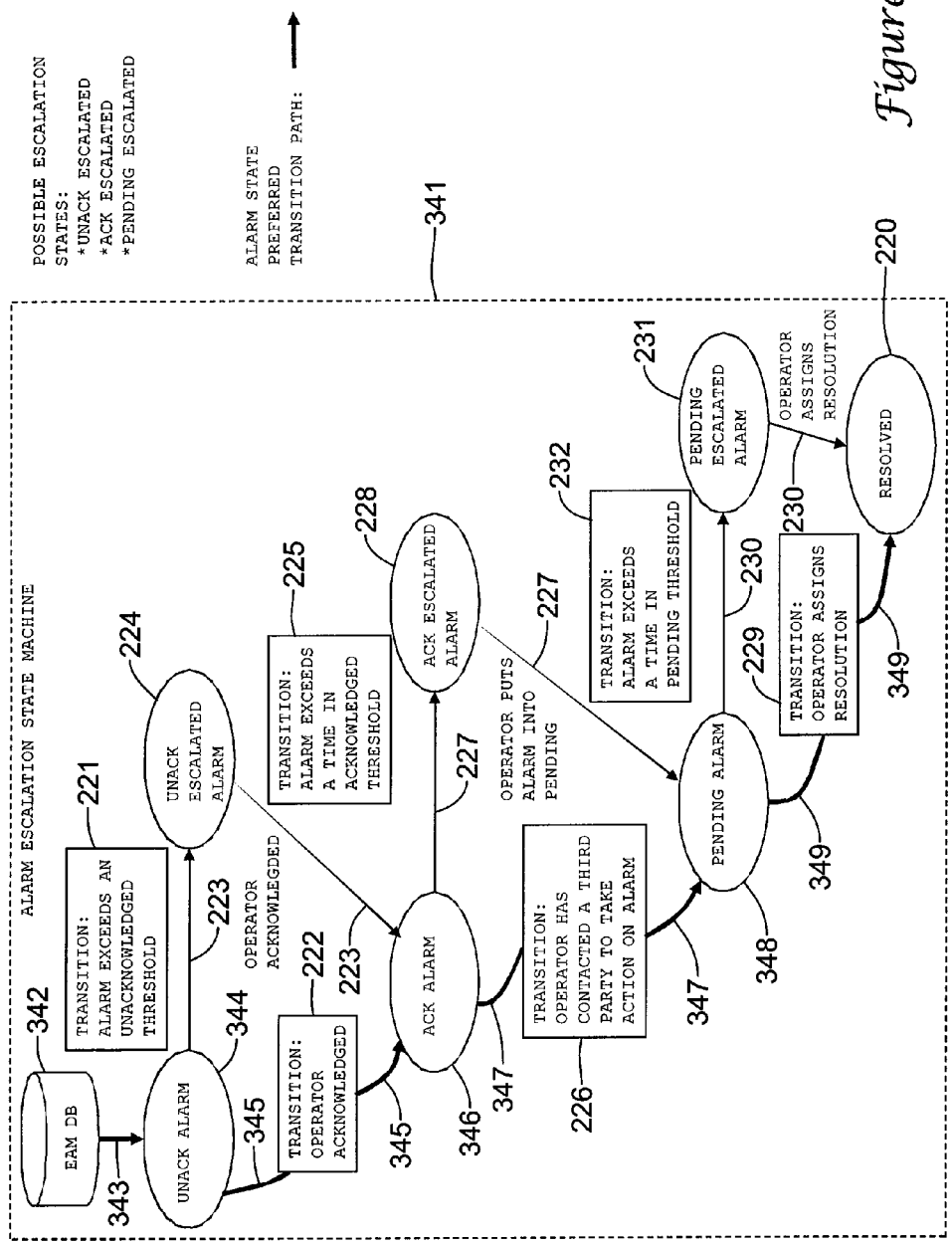
FIG. 22 is a diagram of an alarm management escalation state machine.

The diagram of FIG. 22 shows the alarm state transition paths and the corresponding escalation paths of an alarm escalation state machine 341. Machine 341 may have various alternate state transition paths also. For instance, an unacknowledged alarm may directly be resolved by an operator. In such an alternate transition path, an alarm state engine may automatically assign the alarms to the operator who resolved them. This aspect may give the operator flexibility in making an alarm management decision and at the same time to maintain a consistent alarm state transition. Possible escalation states in machine 341 may include unack escalated, ack escalated and pending escalated. From an EAM database 342 may come an unack alarm at symbol 344 via a transition path 343. The alarm state transition 343 may be that the alarm exceeds an unacknowledged threshold as indicated in symbol 221. From the unack alarm at symbol 344 may come an ack alarm at symbol 346 via a transition path 345. The transition for path 345 may be operator acknowledged at symbol 222. A path 223 may be from symbol 344 to a symbol 224 which indicates an unack escalated alarm. The path 223 may be operator acknowledged. The transition of path 223 may be that an alarm exceeds a time in an acknowledged threshold as indicated in symbol 225.

From the ack alarm at symbol 346 may come a pending alarm at symbol 348 via a transition path 347. A path 347 transition may be indicated in symbol 226 as that the operator has contacted a third party to take action on the alarm. A path 227 may be from symbol 346 to a symbol 228 which indicates an ack escalated alarm. The path 227 may be where the operator puts the alarm in as a pending alarm, at symbol 349.

From the pending alarm at symbol 348 may come a resolved state at symbol 220 via a transition path 349. A path 349 transition may be indicated in symbol 229 that the operator assigns a resolution. A path 230 may be from symbol 248 to a symbol 231 which indicates a pending escalated alarm. A transition of path 230 may be that the alarm exceeds a time in a pending threshold as indicated at symbol 232. The path 230 may continue on from symbol 231 to symbol 220 where the operator assigns a resolution of the alarm.

To recap, an alarm management system may have one or more interfaces connected to alarm sources, an alarm management data store connected to the one or more alarm interfaces and an operations interface connected to the alarm management data store. Each alarm interface of the one or more alarm interfaces may have an alarm receiver, an alarm store connected to the alarm receiver and a pre-processor connected to the alarm store and to the alarm management data store. Each alarm may be transformed into a uniform representation that is vendor-neutral. The operations interface may provide filtering according to rules to define groups of alarms. A first set of rules may define groups of alarms and result in filtering alarms according to common attributes. A second set of rules may define groups of alarms and result in filtering alarms according to customer requirements.

Some alarms of the groups of alarms may be routed to operators according to their qualifications to resolve the alarms. Some other alarms of the groups of alarms not routed to operators may be eliminated. Some of the alarms that are eliminated may incorporate unactionable alarms.

The operations interface may have a post processing module connected to the alarm management data store, a work flow management module connected to the alarm management data store and a presentation module connected to the alarm management data store. The post processing module may have an alarm priority assignment module, an alarm suppression sub-module, and an alarm grouping sub-module. The work flow management module may have an alarm state sub-module, an alarm escalation sub-module, an alarm routing sub-module and an alarm notification sub-module. The presentation module may have a filtering sub-module, a reporting sub-module, a user preferences sub-module and a user interface.

An approach for alarm management may incorporate creating an alarm group, providing one or more rules for selecting alarms for inclusion in the alarm group, receiving one or more alarms, determining, according to the one or more rules for selecting alarms, which of the one or more alarms are placed into the alarm group, configuring a routing strategy for the alarm group, mapping the alarm group to an appropriate user group per the routing strategy, providing the one or more alarms placed into the alarm group for action by the user group, and closing one or more alarms which have been subject to action by the user group resulting in resolution.

If one or more alarms are not determined to be placed into the alarm group, then the one or more alarms may be stored in a database waiting for action, and can be displayed to administrators as ungrouped alarms. The one or more rules for selecting alarms may be based on attributes of an alarm. The routing strategy may be configured with a basis on attributes of one or more alarms of the alarm group to enable smart alarm management strategies. The one or more rules for selecting alarms may be defined by needs of an alarm management operating center and/or a service level agreement.

The appropriate user group may have qualified people to handle and possibly resolve a particular type of alarms from the alarm group. The routing strategy may be for routing alarm groups to people based on their roles. An alarm group may be routed to several appropriate user groups based on relevance of the alarms in the alarm group resulting in receipt by any individual who needs information to complete a task.

The one or more rules for selecting alarms may incorporate an application of filters to one or more alarms received for determining which of the one or more alarms are placed into the alarm group. The application of filters may be vendor neutral. The filters may be organized into a hierarchy. The filters may contain sub-filters and the sub-filters may contain sub-sub filters, and so on in a hierarchical manner. Alarms, determined by an application of the filters organized into a hierarchy, may be grouped in a hierarchical structure.

An approach for alarm management may incorporate creating one or more alarm groups, creating one or more rules for each alarm group of the one or more alarm groups, creating one or more user groups, receiving a new alarm, entering the new alarm in appropriate alarm groups according to the one or more rules for each alarm group of the one or more alarm groups, and routing the appropriate alarm group to at least one applicable user group of the one or more user groups. The one or more rules, for each alarm group of the one or more alarm groups, may be based on alarm attributes and/or customer requirements.

A new alarm may be categorized as unacknowledged, acknowledged, assigned, pending, resolved or another categorization. The new alarm may be categorized as escalated or unescalated, based on either a time of the new alarm in any one of the states identified herein, or a frequency of recurrence of the alarm. If the new alarm is categorized as resolved, then the alarm may be removed from its respective alarm group. Another alarm group may be created having rules based on factors common to one or more new alarms if the existing one or more alarm groups are not appropriate for entry of the one or more new alarms.

The present application may be related to U.S. patent application Ser. No. 12/276,285, filed Nov. 21, 2008, and entitled "Building control system user interface with pinned display feature"; and U.S. patent application Ser. No. 12/276,276, filed Nov. 21, 2008, and entitled "Building control system user interface with docking feature". U.S. patent application Ser. No. 12/276,285, filed Nov. 21, 2008, is hereby incorporated by reference. U.S. patent application Ser. No. 12/276,276, filed Nov. 21, 2008, is hereby incorporated by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. An alarm management system comprising:
a computer system configured to include:
   one or more alarm interfaces connected to alarm sources;
   an alarm management data store connected to the one or more alarm interfaces; and
   an operations interface connected to the alarm management data store, the operations interface including:
      a work flow management module having an alarm state sub-module, an alarm escalation sub-module, an alarm routing sub-module and an alarm notification sub-module, and
      a post processing module having an alarm priority assignment module, an alarm suppression sub-module, and an alarm grouping sub-module; and
wherein:
each alarm interface of the one or more alarm interfaces comprises:
   an alarm receiver;
   an alarm store connected to the alarm receiver; and
   a pre-processor connected to the alarm store and to the alarm management data store;
   each alarm is transformed into a uniform representation that is vendor-neutral;
the operations interface provides filtering according to rules to define groups of alarms;
   a first set of rules of the rules to define groups of alarms, result in filtering alarms according to common attributes;
   a second set of rules of the rules to define groups of alarms, result in filtering alarms according to customer requirements
   the post processing module is connected to the alarm management data store; and
   the work flow management module is connected to the alarm management data.

2. The system of claim 1, wherein some alarms of the groups of alarms are routed to operators according to their qualifications to resolve the alarms.

3. The system of claim 2, wherein:
some other alarms of the groups of alarms not routed to operators are eliminated; and
some of the alarms that are eliminated comprise unactionable alarms.

4. The system of claim 1, wherein:
the presentation module comprises:
   a filtering sub-module;
   a reporting sub-module;
   a user preferences sub-module; and
   a user interface.

5. A method for alarm management comprising:
creating an alarm group;
providing one or more rules for selecting alarms for inclusion in the alarm group;
receiving one or more alarms;
determining, according to the one or more rules for selecting alarms, which of the one or more alarms are placed into the alarm group, wherein the alarms are grouped in a hierarchical structure as determined by an application of rules which have a hierarchical structure;
configuring a routing strategy for the alarm group;
mapping the alarm group to an appropriate user group per the routing strategy;
providing the one or more alarms placed into the alarm group for action by the user group; and
closing one or more alarms, which have been subject to action by the user group resulting in resolution; and
wherein another alarm group is created having rules based on factors common to one or more new alarms if the existing one or more alarm groups are not appropriate for entry of the one or more new alarms.

6. The method of claim 5, wherein if one or more alarms are not determined to be placed into the alarm group, the one or more alarms are stored in a database waiting for action, and can be displayed to administrators as ungrouped alarms.

7. The method of claim 5, wherein the one or more rules for selecting alarms are based on attributes of an alarm.

8. The method of claim 5, wherein the routing strategy is configured with a basis on attributes of one or more alarms of the alarm group to enable smart alarm management strategies.

9. The method of claim 5, wherein the one or more rules for selecting alarms are defined by needs of an alarm management operating center and/or a service level agreement.

10. The method of claim 5, wherein the appropriate user group comprises qualified people to handle and possibly resolve a particular type of alarms from the alarm group.

11. The method of claim 5, wherein the routing strategy is for routing alarm groups to people based on their roles.

12. The method of claim 5, wherein an alarm group is routed to several appropriate user groups based on relevance of the alarms in the alarm group resulting in receipt by any individual who needs information to complete a task.

13. The method of claim 5, wherein:
the one or more rules for selecting alarms comprise an application of filters to one or more alarms received for determining which of the one or more alarms are placed into the alarm group; and
the application of filters is vendor neutral.

14. The method of claim 13, wherein:
the filters are organized into a hierarchy;
the filters contain sub-filters; and
sub-filters can contain sub-sub filters, and so on in a hierarchical manner.

15. A method for alarm management comprising:
creating one or more alarm groups;
creating one or more rules for each alarm group of the one or more alarm groups, the rules including one or more filters, the filters having a hierarchical structure to form an alarm group hierarchy;
creating one or more user groups;
receiving a new alarm;
entering the new alarm in appropriate alarm groups according to the one or more rules for each alarm group of the one or more alarm groups; and
routing the appropriate alarm group to at least one applicable user group of the one or more user groups; and
wherein:
the one or more rules for each alarm group of the one or more alarm groups, are based on alarm attributes and/or customer requirements; and
another alarm group is created having rules based on factors common to one or more new alarms if the existing one or more alarm groups are not appropriate for entry of the one or more new alarms.

16. The method of claim 15, wherein the new alarm is categorized as unacknowledged, acknowledged, assigned, pending, resolved or another categorization.

17. The method of claim 15, wherein the new alarm is categorized as escalated or unescalated, based on either a time of the new alarm in any one of the states identified in claim 16, or a frequency of recurrence of the alarm.

18. The method of claim 16, wherein if the new alarm is categorized as resolved, then the alarm is removed from its respective alarm group.

* * * * *